Patented May 9, 1939

2,157,725

UNITED STATES PATENT OFFICE 2,157,725

AZO DYESTUFFS

Werner Zerweck and Wilhelm Kunze, Frankfort-on-the-Main-Fechenheim, Germany, assignors to General Aniline Works, Inc., New York, N. Y., a corporation of Delaware No Drawing. Application October 30, 1937, Serial No. 171,920. In Germany November 5, 1936

4 Claims. (Cl. 260—205)

This invention relates to azo dyestuffs, more particularly to those of the general formula:

NaOOC—alkyl—O₂S—aryl—N=N—R wherein aryl means a radicle of the benzene series the azo group being attached thereto in one of the positions meta and para to the —SO₂— group, and R means the radicle of a coupling component which contains no substituents causing solubility in water.

The new dyestuffs are obtained by combining the diazo compounds of amines of the general formula:

HOOC—alkyl—O₂S—aryl—NH₂ wherein aryl means a radicle of the benzene series the amino group being attached thereto in one of the positions meta and para to the —SO₂— group, with coupling components which contain no substituents causing solubility in water.

The new dyestuffs are especially useful for dyeing and printing acetate artificial silk, and the dyeings and printings thus obtained exhibit good fastness properties. They are distinguished from the dyeings obtained with azo dyestuffs prepared according to French Patent 764,700 by better fastness to light.

The diazo components employed for the manufacture of the new dyestuffs may be prepared for example by oxidizing the alkali salts of the corresponding acetylamino-phenylthioglycolic acids by means of potassium permanganate in a neutral solution and splitting off the acetyl group by treatment with dilute sulfuric acid of about 65 percent.

In order to further illustrate our invention the following examples are given, the parts being by weight and all temperatures in degrees centigrade.

Example 1

21.5 parts of 4-aminophenylsulfonylacetic acid are diazotized in the usual manner and the diazo solution obtained is combined with a solution of 13.5 parts of N,N-dimethyl-m-toluidine containing hydrochloric acid. The formation of the dyestuff is performed by the addition of sodium acetate whereby the free mineral acid is neutralized. The combination product formed is filtered off, dissolved in dilute caustic soda solution and precipitated therefrom by the addition of sodium chloride. The new dyestuff thus obtained of the formula:

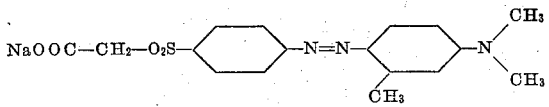

dyes acetate artificial silk from a neutral or weakly acid (acetic) bath strong reddish orange shades of valuable fastness properties.

Similar dyestuffs are obtained by employing as coupling components other tertiary amines of the benzene series which may also contain oxethyl groups.

By combining 3-methoxy-4-aminophenylsulfonylacetic acid with N,N-dimethyl-m-toluidine a dyestuff of good tinctorial power is obtained which yields reddish orange dyeings on acetate artificial silk.

Example 2

21.5 parts of 3-aminophenyl-sulfonylacetic acid are diazotized and the diazo solution obtained is combined in the presence of sodium acetate with a solution of 20 parts of N-benzyl-m-toluidine. The reaction product is isolated as sodium salt of the following formula:

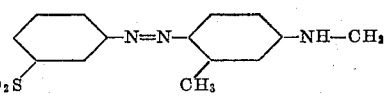

and worked up in the usual manner. It dyes acetate silk strong reddish yellow shades.

Example 3

25 parts of 3-chloro-4-aminophenylsulfonylacetic acid are diazotized in the usual manner and the diazo solution obtained is combined with a solution of 14 parts of N,N-dimethyl-m-toluidine containing hydrochloric acid. When the combination is complete, caustic alkali solution is added to render the mixture alkaline and then the sodium salt of the dyestuff formed is precipitated by the addition of sodium chloride. The new dyestuff thus obtained of the formula:

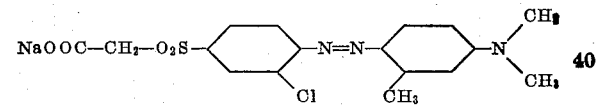

dyes acetate artificial silk from a neutral or weakly acid bath bright orange shades of valuable properties, especially of very good fastness to light and good fastness to water and washing. The dyeings give pure white discharging effects.

Similar dyestuffs are obtained by employing as coupling components N,N-dimethylaniline, N,N-diethylaniline, 1-amino-2-methoxy-5-methylbenzene and the like.

Example 4

The diazo solution prepared according to Example 3 from 25 parts of 3-chloro-4-aminophenyl-sulfonylacetic acid is combined with a solution of 21 parts of N-oxethyl-N-butyl-m-toluidine. When the combination is complete, the dyestuff is filtered off, and dissolved in an aqueous caustic alkaline solution. Then, by the addition of sodium chloride, the sodium salt of the dyestuff formed of the formula:

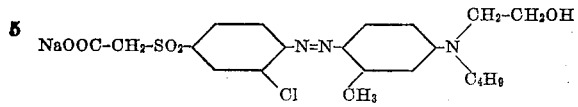

is precipitated which dyes acetate silk clear reddish orange shades distinguished by good fastness properties.

The dyestuff obtained in an analogous manner by coupling with 1-N,N-dioxethyl-amino-2-methoxy-5-methylbenzene dyes acetate silk bright scarlet shades of good fastness to water and washing.

By using instead of the diazo component mentioned the 6-methyl-3-chloro-4-amino-phenyl-sulfonylacetic acid, dyestuffs are obtained with the coupling components mentioned in the Examples 3 and 4, which dye acetate silk valuable orange to yellowish-scarlet shades.

*Example 5*

The diazo solution prepared according to Example 3 from 25 parts of 3-chloro-4-aminophenyl-sulfonylacetic acid is combined with a soda alkaline solution of 17.5 parts of 1-phenyl-3-methyl-5-pyrazolone. The dyestuff formed of the formula:

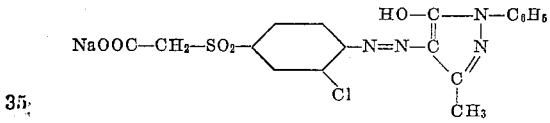

is precipitated by the addition of sodium chloride and isolated; it dyes acetate silk in a bath containing a little quantity of acetic acid clear yellow shades showing good fastness properties.

When using 1-(2'-chlorophenyl)-3-methyl-5-pyrazolone, 1-phenyl-5-pyrazolone-3-carbonamide or p-cresol as coupling components dyestuffs of similar shades are obtained.

*Example 6*

A diazo solution prepared in the usual manner from 25 parts of 2-chloro-4-amino-phenylsulfonylacetic acid is poured into a solution of 24 parts of 1-(N-oxethyl-N-butylamino)-2-methoxy-5-methylbenzene and the whole is rendered acid by means of acetic acid. The dyestuff thus formed is converted into its sodium salt having the formula:

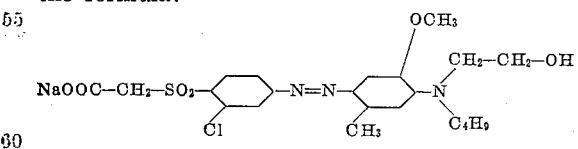

and used as such for dyeing acetate silk. From a neutral bath strong red shades of valuable fastness properties, particularly to light, and of a very good tinctorial power, are obtained. The dyeings have no phototropic properties.

When using tetrahydro-3.7-dihydroxynaphthoquinoline as coupling component, a strong and clear violet is obtained.

*Example 7*

The diazo solution, prepared in the usual manner by diazotizing 25 parts of 2-chloro-4-amino-phenyl-sulfonylacetic acid is added, while stirring, to a solution of 16 parts of N,N-diethylaniline in the presence of acetic acid. The dyestuff precipitated is filtered off and converted into its sodium salt of the formula:

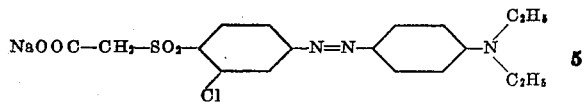

which is used as such for dyeing acetate silk. It dyes orange shades distinguished by a very good fastness to light and water and a very good tinctorial power. The dyeings have no phototropic properties.

Similar dyestuffs are also obtained by using N,N-dimethyl-3-toluidine and N-oxethyl-N-cyanethyl-3-toluidine as coupling components.

*Example 8*

28.5 parts of 2.5-dichloro-4-aminophenylsulfonylacetic acid are diazotized in the usual manner in a solution containing an excess of sulfuric acid. The diazo solution obtained is diluted with a little amount of ice-water and added while stirring to a solution of 25 parts of the hydrochloride of tetrahydro-3.7-dihydroxy-naphthoquinoline, whereby the combination occurs at once. Then the sodium salt of the dyestuff formed of the formula:

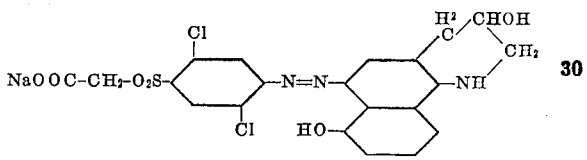

is precipitated by the addition of sodium chloride. It has a good affinity for acetate artificial silk and yields dyeings of bright blue shades which are distinguished by good fastness to light, water and washing.

By combining the above said diazo component with other coupling components such as for example N,N-diethylaniline, N-oxethyl-N-methylaniline and the like, scarlet dyeing products are obtained. When 2.5-dichloro-4-aminophenylsulfonylacetic acid is combined with N,N-dioxethyl-3-toluidine, a dyestuff is obtained of the formula:

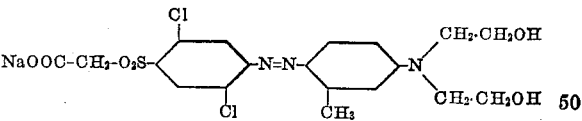

which yields on acetate artificial silk scarlet shades of very good fastness to light and water.

*Example 9*

26.4 parts of 3-chloro-4-aminophenylsulfonylpropionic acid are diazotized in the usual manner and the diazo solution obtained is coupled with a solution of 15 parts in N,N-diethylaniline. The formation of the dyestuff occurs in a weakly acetic acid medium. Then the dyestuff is converted into its sodium salt, having the formula:

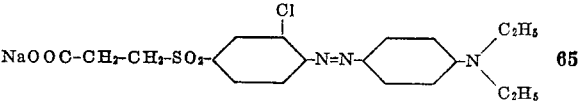

which dies acetate silk in a bath containing acetic acid strong reddish orange shades.

Dyestuffs dyeing acetate silk scarlet shades are obtained by combining the mentioned diazo component with N,N-dimethyl-3-toluidine or N-oxethyl-N-butyl-3-toluidine. The dyestuff obtained by starting from tetrahydro-3.7-dihydroxynaphthoquinoline dyes acetate silk bright blue shades.

Example 10

26 parts of 2-nitro-4-aminophenylsulfonyl-acetic acid are diazotized in a strong sulfuric acid. The diazo solution thus obtained is combined with a hydrochloric solution of 15 parts of N,N-diethylaniline. The copulation is completed by neutralizing the mineral acid by means of sodium acetate; then the dyestuff formed is filtered off, washed and transformed into its sodium salt of the formula:

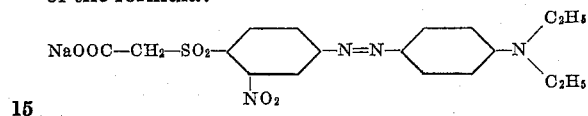

It dyes acetate silk in a neutral or weakly acid bath (acetic acid) bright scarlet shades distinguished by very good fastness properties.

We claim:

1. Azo dyestuffs of the general formula:

NaOOC—alkyl—O₂S—aryl—N=N—R

wherein aryl means a radicle of the benzene series the azo group being attached thereto in one of the positions meta and para to the —SO₂— group, and R means the radicle of a coupling component which contains no substituents causing solubility in water, which dyestuffs dye acetate artificial silk various shades of good fastness properties.

2. The azo dyestuff of the formula:

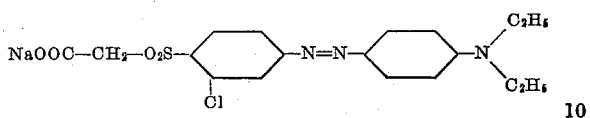

which dyestuff dyes acetate artificial silk orange shades of very good fastness to light and water.

3. The azo dyestuff of the formula:

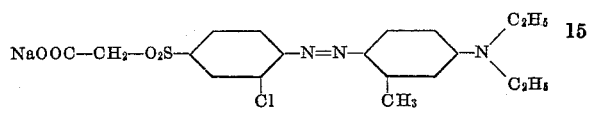

which dyestuff dyes acetate artificial silk bright orange shades of very good fastness to light and good fastness to water and washing.

4. The azo dyestuff of the formula:

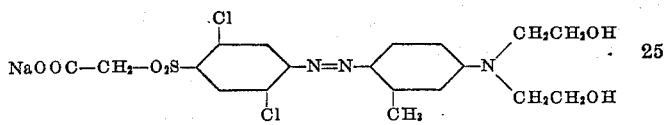

which dyestuff dyes acetate artificial silk scarlet shades of very good fastness to light and water.

WERNER ZERWECK.
WILHELM KUNZE.